US006610556B2

United States Patent
Vigna et al.

(10) Patent No.: US 6,610,556 B2
(45) Date of Patent: Aug. 26, 2003

(54) METHOD FOR MANUFACTURING A MICROINTEGRATED STRUCTURE WITH BURIED CONNECTIONS, IN PARTICULAR AN INTEGRATED MICROACTUATOR FOR A HARD-DISK DRIVE UNIT

(75) Inventors: Benedetto Vigna, Pietrapertosa (IT); Paolo Ferrari, Gallarate (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 10/124,781

(22) Filed: Apr. 16, 2002

(65) Prior Publication Data

US 2002/0109419 A1 Aug. 15, 2002

Related U.S. Application Data

(62) Division of application No. 09/523,571, filed on Mar. 10, 2000, now Pat. No. 6,396,174.

(30) Foreign Application Priority Data

Mar. 22, 1999 (EP) .............................. 99830158

(51) Int. Cl.[7] .................. H01L 21/00; H01L 21/20; H01L 21/36; H02N 1/00
(52) U.S. Cl. .................. 438/50; 438/489; 310/309; 310/40 MM
(58) Field of Search .................. 438/50, 51, 52, 438/53, 489; 310/40 MM, 309

(56) References Cited

U.S. PATENT DOCUMENTS

| | | | |
|---|---|---|---|
| 4,937,202 A | 6/1990 | Maas | 437/40 |
| 5,493,156 A | 2/1996 | Okada | 310/44 MM |
| 5,992,236 A | 11/1999 | White et al. | 73/622 |
| 6,180,478 B1 | 1/2001 | Lee et al. | 438/309 |
| 6,197,655 B1 | 3/2001 | Montanini et al. | 438/411 |
| 6,209,394 B1 | 4/2001 | Ferrari et al. | 73/504.17 |

OTHER PUBLICATIONS

Gates, H.R., "Buried Resistor Structure," *IBM Technical Disclosure Bulletin*, vol. 12, No., 12, May 1970, p. 2061.
Gennissen et al., "Thick Polysilicon Microstructures By Combination Of Epitaxial And Poly Growth In A Single Deposition Step," *Proceeding of the 1996 National Sensor Conference*, Delft, Mar. 20–12, 1996, pp. 189–192.
Fan and Woodman, "Batch Fabrication Of Mechanical Platforms For High Density," *IBM Research Division*.

*Primary Examiner*—John F. Niebling
*Assistant Examiner*—Viktor Simkovic
(74) *Attorney, Agent, or Firm*—Lisa K. Jorgenson; Robert Iannucci; Seed IP Law Group PLLC

(57) ABSTRACT

The method is intended for manufacturing a microintegrated structure, typically a microactuator for a hard-disk drive unit and includes the steps of: forming interconnection regions in a substrate of semiconductor material; forming a monocrystalline epitaxial region; forming lower sinker regions in the monocrystalline epitaxial region and in direct contact with the interconnection regions; forming insulating material regions on a structure portion of the monocrystalline epitaxial region; growing a pseudo-epitaxial region formed by a polycrystalline portion above the structure portion of the monocrystalline epitaxial region and elsewhere a monocrystalline portion; and forming upper sinker regions in the polycrystalline portion of the pseudo-epitaxial region and in direct contact with the lower sinker regions. In this way no PN junctions are present inside the polycrystalline portion of the pseudo-epitaxial region and the structure has a high breakdown voltage.

14 Claims, 5 Drawing Sheets

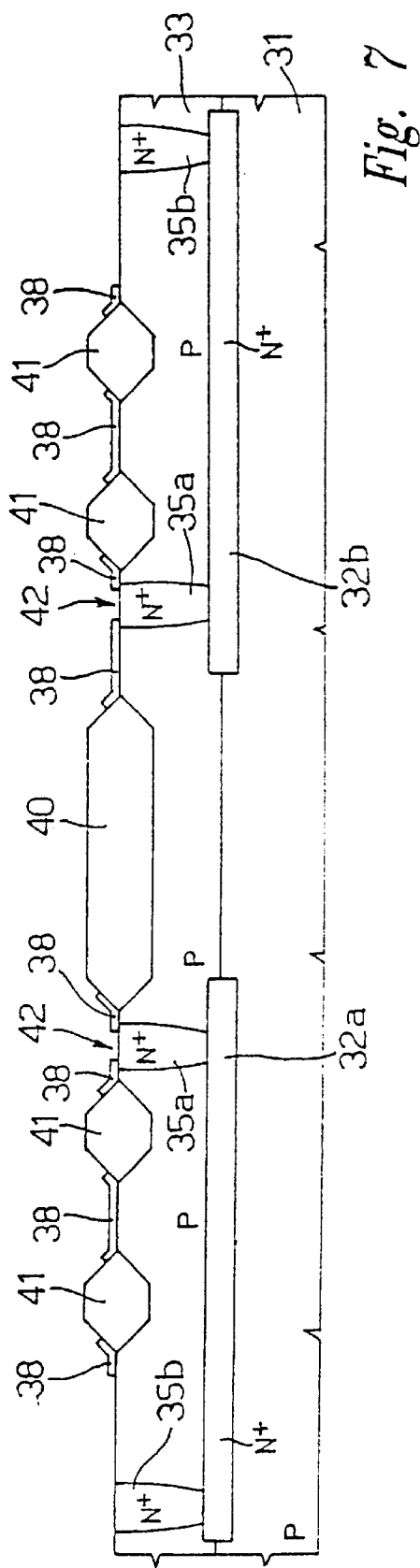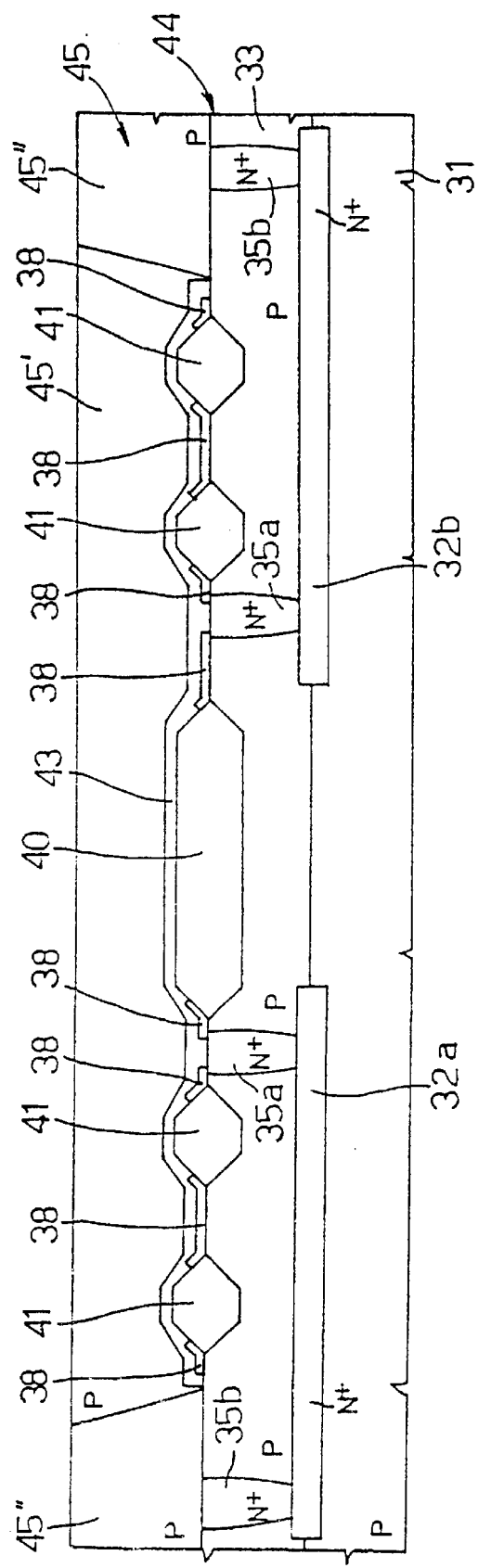

METHOD FOR MANUFACTURING A MICROINTEGRATED STRUCTURE WITH BURIED CONNECTIONS, IN PARTICULAR AN INTEGRATED MICROACTUATOR FOR A HARD-DISK DRIVE UNIT

CROSS-REFERENCE TO RELATED APPLICATION

This application is a division of U.S. patent application Ser. No. 09/523,571, filed Mar. 10, 2000, now U.S. Pat. No. 6,396,174, which application is incorporated herein by reference in its entirety.

BACKGROUND OF THE INVENTION

1. Field of the Invention

The present invention relates to a method for manufacturing a microintegrated structure with buried connections, in particular an integrated microactuator for a hard disk drive unit.

2. Description of the Related Art

As known, hard disks are the most widely used medium for storing data in personal computers; consequently, they are produced in very large quantities and the maximum data storage capacity increases year by year. Hard disks are read and written by a drive unit, the general structure whereof is shown in FIGS. 1 and 2 and is described hereinbelow.

In particular, FIG. 1 shows a drive unit 1 of rotary type comprising a motor 2 (also called "voice coil motor") fixed to a support body 3 usually called E-block owing to its E-shape when viewed laterally (see FIG. 2). The support body 3 has a plurality of arms 4, each carrying a suspension 5 formed by a steel blade fixed in cantilever fashion. Each suspension 5 has, at its end not fixed to the support body 3, a joining piece, called gimbal or flexure 8, also made of steel and carrying a read/write transducer also called slider 6 and arranged (in the operative condition) facing a surface of a hard disk 7.

The slider 6 is formed by a support body bearing, fixed thereto, a magneto/resistive and inductive R/W head 9 forming the actual read/write device; electric wires (not shown) extend from the R/W head 9 along the flexure 8 and the suspension 5 as far as a signal processing device (also not shown) fixed to the mother board of the personal computer or other apparatus comprising data storage hard disks.

In the read/write devices for hard disks currently commercially available, the slider 6 is glued directly to the flexure 8. To obtain a more precise and fine control of the position of the slider 6, it has already been proposed to use a double actuation stage, with a first courser actuation stage, comprising the motor 2 displacing the assembly formed by support body 3, suspension 5, flexure 8 and slider 6 across the hard disk 7 when carrying out an approximate track search, and a second actuation stage, comprising an integrated microactuator 10 arranged between the slider 6 and the flexure 8 and performing finer control of the position of the slider 6 when searching for a track.

Different technologies have been proposed for manufacturing the integrated microactuator, such as surface micromachining, which use polycrystalline surface layers of semiconductor material deposited over a semiconductor material wafer, electrogalvanic growth, or ad hoc processes other than those normally used in microelectronics.

The proposed methods using the technique of surface micromachining have the drawback that they do not allow integration of the microactuator with the control and drive circuits or involve low-output and very costly post-machining steps.

Other known solutions involve the use of ductile materials such as nickel or its alloys. However, these solutions are also not free from drawbacks. Although nickel can dissipate internally the mechanical energy, its plastic behavior makes final quality control of the end device particularly expensive and difficult.

European patent application No. 97830537.3, dated Oct. 29, 1997 and owned by STMicroelectronics, S.r.l., describes a method for manufacturing an integrated microactuator formed in the epitaxial layer of a semiconductor material wafer. In particular, according to the solution described in this patent application, buried interconnection regions are formed in a monocrystalline silicon substrate, and then a sacrificial region and isolating regions, comprising silicon oxide, are formed on the substrate surface; a polycrystalline silicon seed layer is then deposited on the substrate and the silicon oxide regions and then an epitaxial layer is grown, which is polycrystalline above the silicon oxide regions and elsewhere monocrystalline; the electronic components of the circuitry are then formed within and above the monocrystalline portion of the epitaxial layer, while the conductive regions necessary for forming the microactuator are formed in the polycrystalline portion; then the epitaxial layer is etched to define and separate from one another a rotor and a stator; finally, the sacrificial region is removed to free the movable structures from the rest of the wafer.

This solution, although very advantageous as regards the mechanical characteristics, owing to the reduced risk of sticking of the movable structures and the lower manufacturing costs compared to other known solutions, has the problem that PN junctions are present between the buried N-type connection regions, necessary for biasing the various regions of the actuator, and the P-type seed layer necessary for epitaxial growth in the mutually facing zones. These PN junctions have low and in particular non-controllable breakdown voltages that limit the applicable operative biasing voltages of the microactuator.

BRIEF SUMMARY OF THE INVENTION

An embodiment of the invention overcomes the drawback associated with the preceding solution, increasing the usable biasing voltage values.

An embodiment is directed to a method for manufacturing a microintegrated structure, typically a microactuator for a hard-disk drive unit and includes the steps of: forming interconnection regions in a substrate of semiconductor material; forming a monocrystalline epitaxial region; forming lower sinker regions in the monocrystalline epitaxial region and in direct contact with the interconnection regions; forming insulating material regions on a structure portion of the monocrystalline epitaxial region; growing a pseudo-epitaxial region formed by a polycrystalline portion above the structure portion of the monocrystalline epitaxial region and elsewhere a monocrystalline portion; and forming upper sinker regions in the polycrystalline portion of the pseudo-epitaxial region and in direct contact with the lower sinker regions. In this way no PN junctions are present inside the polycrystalline portion of the pseudo-epitaxial region and the structure has a high breakdown voltage.

BRIEF DESCRIPTION OF THE DRAWINGS

In order to illustrate the present invention, a preferred embodiment thereof is now described, purely by way of a non-limiting example, with reference to the accompanying drawings, wherein:

FIGS. 4 to 10 show cross-sections through a semiconductor material wafer, taken along line IV—IV of FIG. 3, during different steps of the present method.

DETAILED DESCRIPTION OF THE INVENTION

Figure 1:
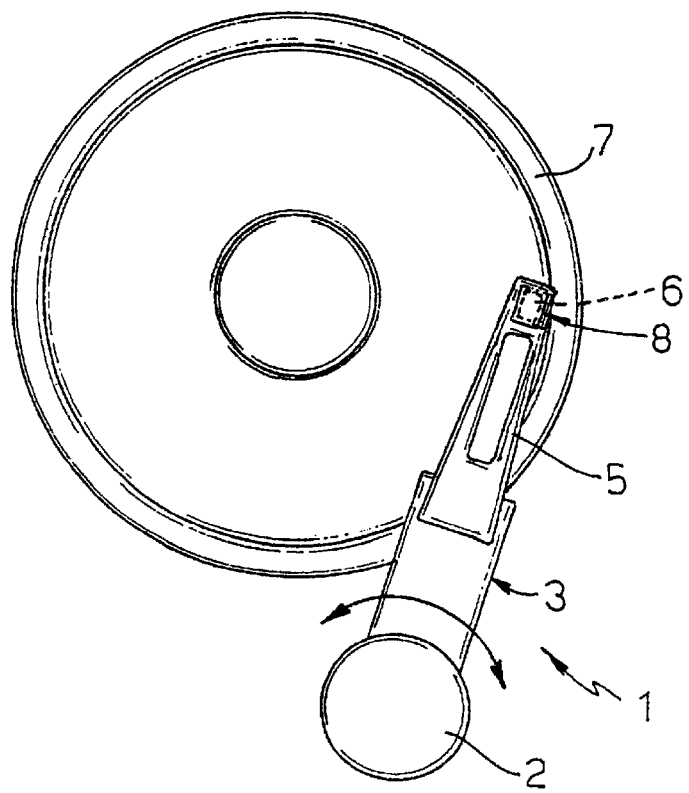
FIG. 1 shows a plan view of a drive unit for hard disks, of known type.
Figure 2:
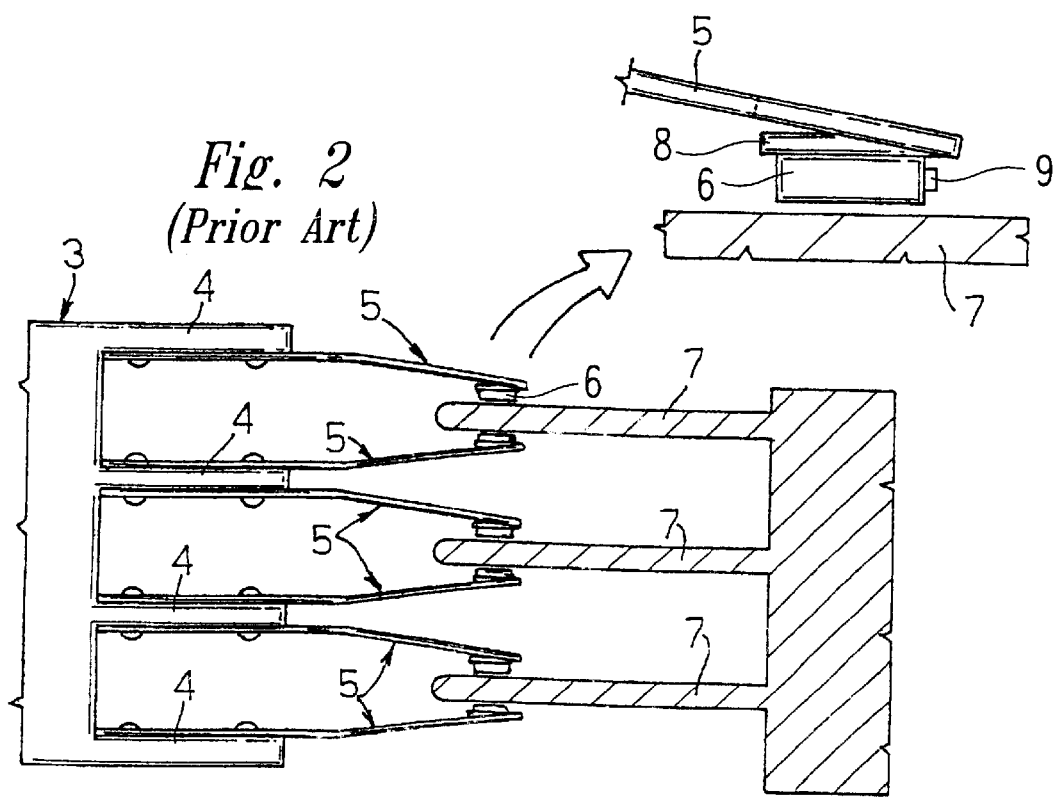
FIG. 2 shows a partially broken side view, on a larger scale, of the drive unit according to FIG. 1.
Figure 3:
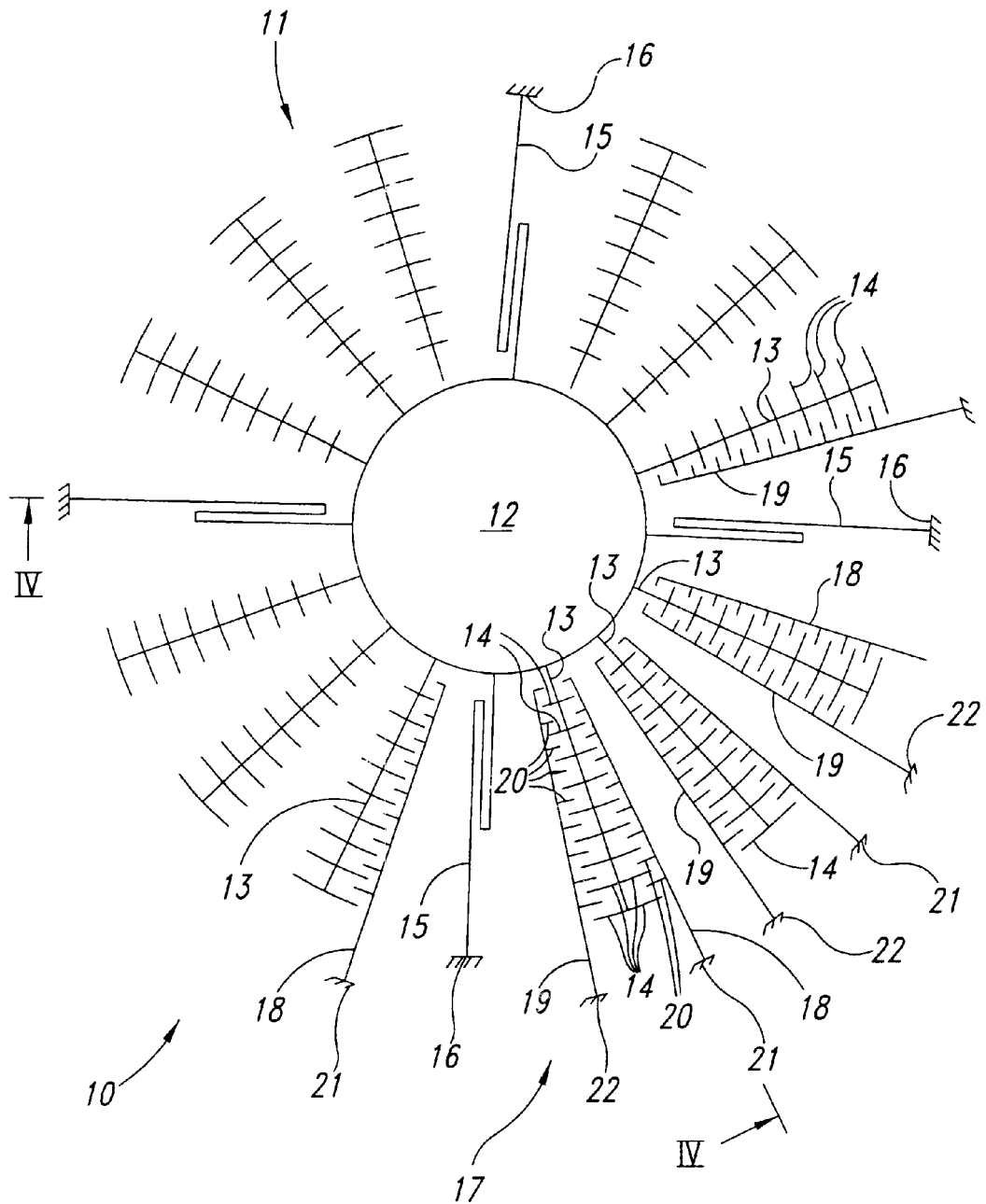
FIG. 3 shows a diagrammatic view of a microactuator of known type, which can be manufactured using the present method.

FIG. 3 shows a microactuator 10 of rotary electrostatic type usable in a hard disk drive unit (not shown), only part whereof is shown in its entirety in view of its axial symmetry.

The microactuator 10 comprises a stator 17 and a rotor 11 capacitively coupled to the stator 17.

The rotor 11 comprises a suspended mass 12 having a substantially circular shape and a plurality of movable arms 13 extending radially outwards from the suspended mass 12. Each movable arm 13 carries a plurality of movable electrodes 14 extending in a substantially circumferential direction and equidistant from each other. The rotor 11 also comprises resilient suspension and anchoring elements (springs 15) for supporting and biasing the rotor 11 through fixed biasing regions 16.

The stator 17 comprises a plurality of fixed arms 18, 19 extending radially and each carrying a plurality of fixed electrodes 20; in particular, each movable arm 13 has, associated thereto, a pair of fixed arms formed by a fixed arm 18 and a fixed arm 19; the fixed electrodes 20 of each pair of fixed arms 18, 19 extend towards the associated movable arm 13 and are arranged or interdigitated between the movable electrodes 14. The fixed arms 18 are all arranged on the same side of the respective movable arms 13 (for example on the right-hand side) and are all biased at the same potential by biasing regions 21; similarly, the fixed arms 19 are all arranged on the other side of the respective movable arms 13 (for example on the left-hand side) and are all biased at the same potential by biasing regions 22.

The fixed arms 18 and 19 are biased at different potentials to generate two potential differences with respect to the movable arms 13 and cause rotation of the rotor 11 in either direction.

The method for manufacturing the microactuator 10 will now be described with reference to FIGS. 4 to 10, taken along a broken line IV—IV of FIG. 3, to show the buried contact of the springs 15 and the fixed arms 18. The fixed arms 19 are connected in a manner similar to the fixed arms 18.

Figure 4:
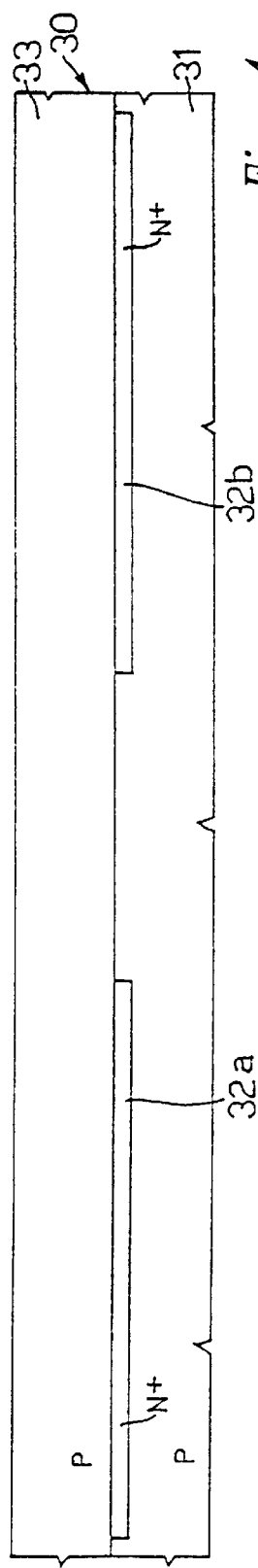

In detail, starting from a wafer 30 formed by a monocrystalline substrate 31 of P-type semiconductor material (silicon), initially a phototechnical masking and selective implantation step of antimony ions for forming N-type buried connection regions is performed. In particular, FIG. 4 shows a buried connection region 32a for electrically connecting a spring (15 in FIG. 3) and buried connection region 32b for electrically connecting a fixed arm (18 in FIG. 3). A first epitaxial growth, resulting in the formation of a P-type monocrystalline epitaxial region 33, preferably with a thickness of 10 microns and resistivity of 15 Ohm/cm, is then performed. The structure according to FIG. 4 is thus obtained.

Figure 5:
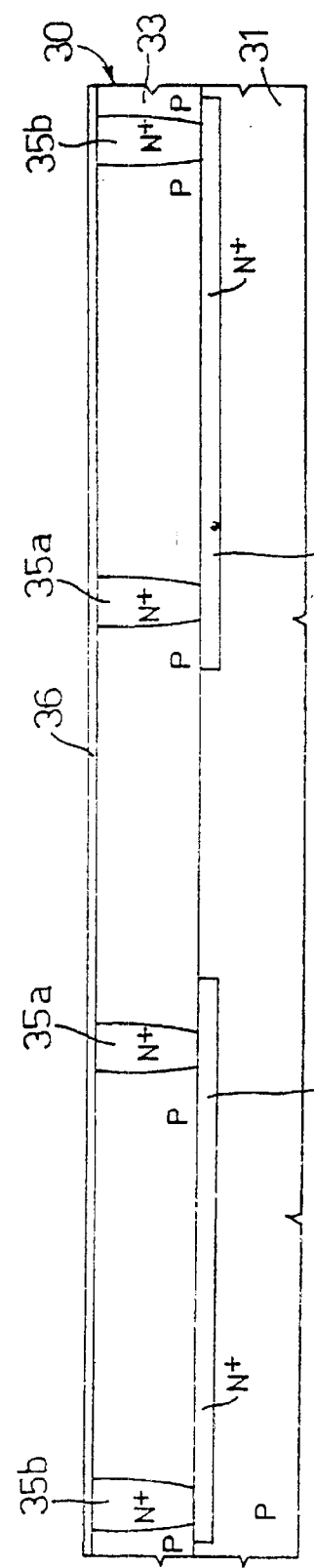

The surface of the monocrystalline epitaxial region 33 is then oxidized so as to form a pad oxide layer 36 with a thickness of about 500 nm; then a masked selective implantation and subsequent diffusion of $POCl_3$ is carried out to form N-type lower sinker regions extending over the entire thickness of the monocrystalline epitaxial region 33 and in direct contact with the ends of the buried connection regions 32a, 32b. The structure according to FIG. 5 is therefore obtained, the lower sinker regions being shown at 35a and 35b, respectively, near the radially internal and external ends of the buried connection regions 32a, 32b.

Figure 6:
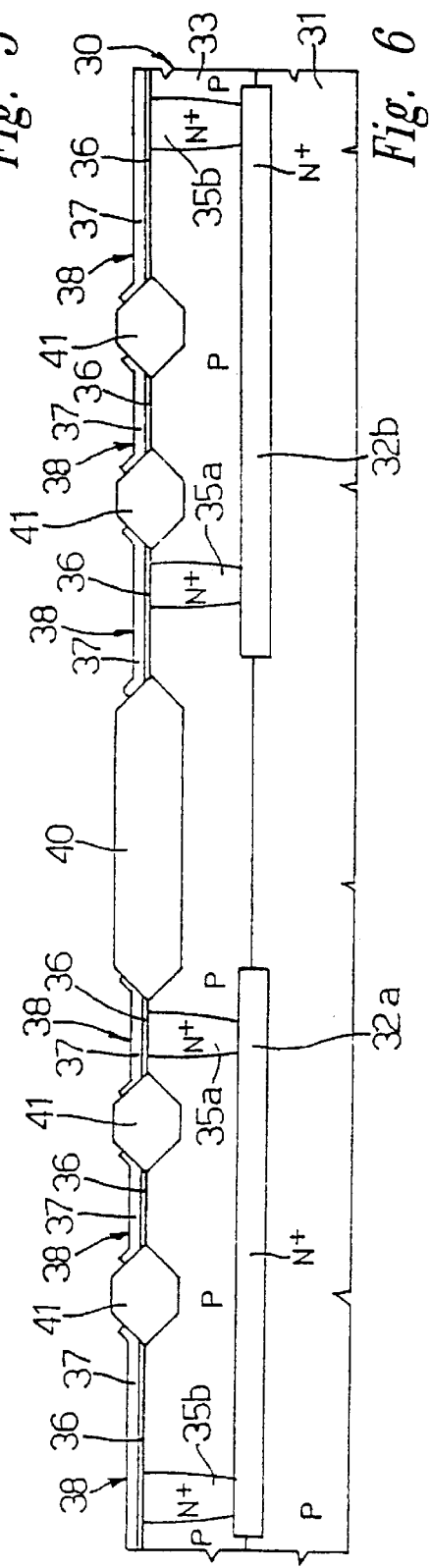

A silicon nitride layer 37 is then deposited onto the pad oxide layer 36. The silicon nitride layer 37 is then defined and selectively removed to obtain protective regions, indicated at 38, selectively covering the surface of the monocrystalline epitaxial region 33. Thereafter, the portions of the surface of the monocrystalline epitaxial region not covered by the protective regions 36, 37 are oxidized locally and form oxide regions comprising a sacrificial region 40 and buried oxide regions 41 with a thickness, for example, of 2 $\mu$m. The structure according to FIG. 6 is thus obtained.

Then, through a suitable masking step, the portions of the protective regions 38 intended to form the contacts with the buried interconnection regions 32a, 32b and the portions of the protective regions 38 arranged outside the actuator region (right-hand and left-hand end in FIG. 7) are removed. In particular, the protective regions 38 are removed below the circuitry zone (not shown). Openings 42 are formed between the sacrificial oxide region 40 and the buried oxide regions 41 closest thereto (in the radially internal lower sinker regions 35a). Therefore the structure of FIG. 7 is obtained, wherein, for simplicity, the pad oxide layer 36 below the silicon nitride layer 37 has not been shown.

A polycrystalline or amorphous silicon layer with a thickness, for example, of 300–4000 nm is then deposited; by a plasma phototechnical etching step, the polycrystalline or amorphous silicon layer is then removed outside the zone intended to house the actuator 10, forming a seed region 43 (FIG. 8). Then, a second epitaxial growth is performed, forming a P-type pseudo-epitaxial layer 45 with a thickness for example of 10–30 $\mu$m. The pseudo-epitaxial layer 45 has a polycrystalline structure (polycrystalline portion 45') above the seed region and, elsewhere, a monocrystalline structure (monocrystalline portion 45"). A wafer 44 shown in FIG. 8 is thus obtained.

Figure 9:
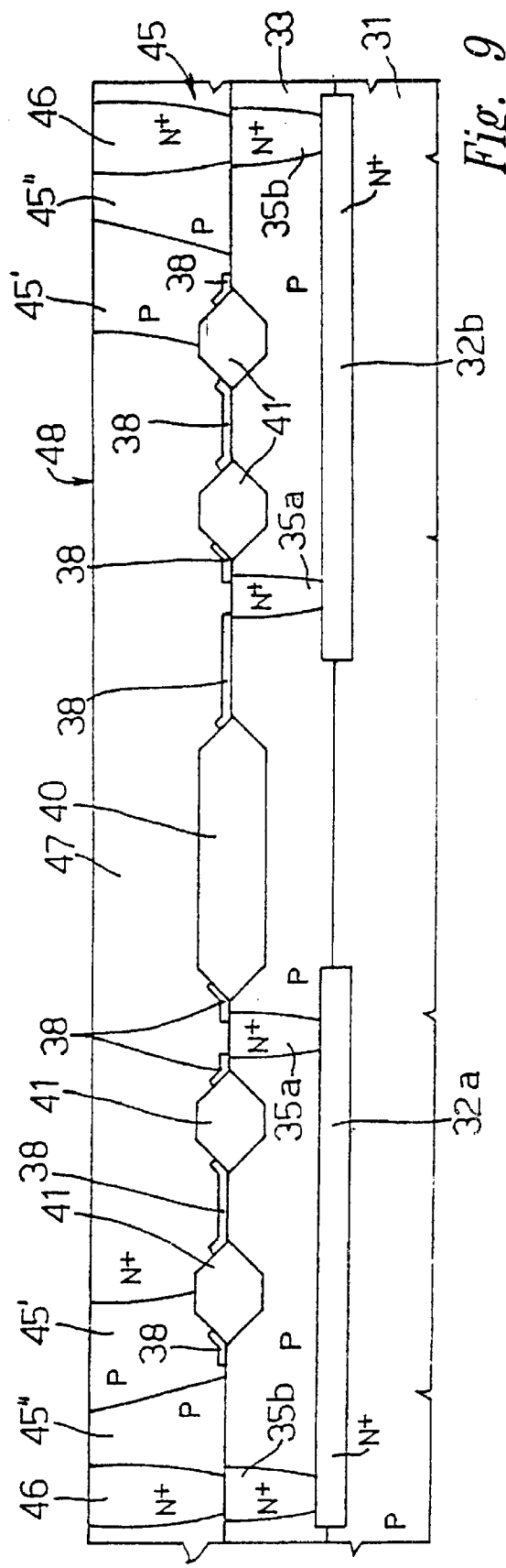

Thereafter, the pseudo-epitaxial layer 45 is doped with doping ions suitable for giving an N-type conductivity for forming sinker regions; in particular, according to FIG. 9, upper sinker regions 46 are formed in the monocrystalline portion 45", above and aligned with the radially external lower sinker regions 35b, over the whole thickness of the pseudo-epitaxial layer 45. Moreover, a pocket 47 intended to form the suspended mass 12, the movable and fixed arms 13, 18 and 19, the springs 15, the fixed regions 21, 22 and 16 is formed in the polycrystalline portion 45', the pocket also extending from the surface 48 of the pseudo-epitaxial layer 45 as far as the monocrystalline epitaxial region 33.

Thereafter, carrying out standard steps not shown, electronic components of the circuitry are formed inside and above the monocrystalline portion 45", as well as one or more protective layers, metal contact regions and a passivation layer are formed above the surface 48.

Subsequently, using a suitable resist or deposited oxide mask, the monocrystalline epitaxial region 33 is etched, forming a trench 50 separating the suspended mass 12, the movable arms 13 and the anchoring elements 15 from the fixed arms 18, 19 as well as the biasing regions 16, 21, 22 from each other.

Figure 10:
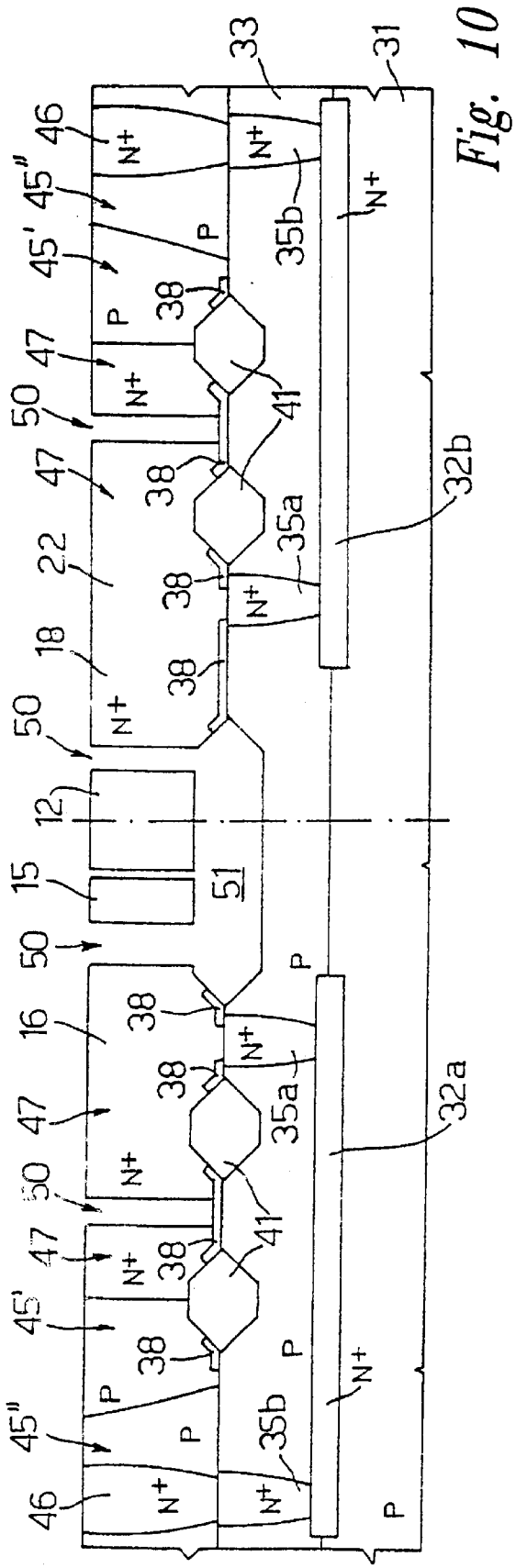

Finally, via the trench 50, the sacrificial region 40 is removed by etching in hydrofluoric acid to form an air gap 51 and to free the movable arms 13 and the movable and fixed electrodes 14, 20. The final structure shown in FIG. 10 is thus obtained.

The advantages of the described manufacturing method include the following. Owing to the two-stage formation of the epitaxial layer, the buried interconnection regions 32a, 32b are surrounded only by monocrystalline silicon regions 31, 33 (buried regions in the bulk); in particular, there is no longer contact between the buried interconnection regions 32a, 32b and the P-type polycrystalline seed region 43; consequently there are no longer PN junctions inside the polycrystalline portion 45', except the border of the pocket 47 where, however, no active structures are present and no high voltages are applied. The structure is therefore able to withstand high voltages (80–100 V) necessary in the case where large displacements (up to 10 μm) must be obtained and/or high masses (up to a few milligrams) must be provided.

The thus obtained structure may be completely integrated with the present electronic circuits, in particular with the associated drive and control circuit; moreover, since it is made of semiconductor silicon, it is not fragile and is suitable for manufacturing drive units for hard disks.

Finally, many modifications and variations may be made to the method described and illustrated herein, all that fall within the scope of the invention, as defined in the accompanying claims. In particular, it is emphasized that the described solution is applicable not only to the manufacture of microactuators for hard disk drive circuits, but also to sensors, electromechanical and opto-electromechanical components, and in general to all microstructures based on semiconductor technology to which high voltages ($\geq 40$ V) must be applied.

What is claimed is:

1. A method for manufacturing a microintegrated structure comprising:
    forming interconnection regions in a substrate of semiconductor material;
    carrying out a first epitaxial growth, thereby forming a monocrystalline epitaxial region above the interconnection regions;
    forming lower sinker regions in said monocrystalline epitaxial region, in direct contact with said interconnection regions;
    forming insulating material regions on a structure portion of said monocrystalline epitaxial region;
    carrying out a second epitaxial growth, thereby forming a pseudo-epitaxial region comprising a polycrystalline portion above said structure portion and elsewhere a monocrystalline portion; and
    forming upper sinker regions in said polycrystalline portion of said pseudo-epitaxial region, in direct contact with said lower sinker regions.

2. A method according to claim 1 wherein said substrate, said monocrystalline epitaxial region and said monocrystalline portion of said pseudo-epitaxial region have a first conductivity type and said interconnection regions, said lower sinker regions and said upper sinker regions have a second conductivity type.

3. A method according to claim 2 wherein:
    said lower sinker regions comprise first regions in contact with a first end of respective interconnection regions and second regions in contact with a second end of said respective interconnection regions; and
    said upper sinker regions comprise third regions substantially aligned with said second regions and a pocket region, said pocket region extending in said polycrystalline portion of said pseudo-epitaxial region and having portions in direct electrical contact with said first regions.

4. A method according to claim 1 wherein said step of forming insulating material regions comprises forming insulating regions and at least one sacrificial region, the method further comprising:
    the steps of forming trenches in said polycrystalline portion of said pseudo-epitaxial region and removing said at least one sacrificial region through said trenches thereby forming suspended structures.

5. A method according to claim 4 wherein said microintegrated structure includes a microactuator comprising a rotor and a stator; said rotor comprising a suspended mass connected, by suspension elements, to anchoring and biasing portions formed in said polycrystalline portion of said pseudo-epitaxial region and connected to respective interconnection regions by respective first regions; said polycrystalline portion of said pseudo-epitaxial region also housing fixed biasing regions connected to fixed electrodes of said stator and, through respective first regions, to respective interconnection regions.

6. A method according to claim 1 wherein said step of forming insulating material regions comprises the steps of forming protective regions of non-oxidizable material extending over said monocrystalline epitaxial region and covering said lower sinker regions; carrying out local oxidation; and selectively removing said protective regions at least partially above said lower sinker regions.

7. A method for manufacturing a microintegrated structure, comprising:
    forming interconnection regions in a substrate of semiconductor material;
    carrying out a first epitaxial growth, thereby forming a monocrystalline epitaxial layer above the interconnection regions and substrate;
    forming lower sinker regions in the monocrystalline epitaxial layer, in direct contact with the interconnection regions;
    forming a semiconductor seed layer on a structure portion of the monocrystalline epitaxial layer;
    carrying out a second epitaxial growth, thereby forming a polycrystalline epitaxial region above the structure portion; and
    forming upper sinker regions in the polycrystalline epitaxial region, in direct contact with the lower sinker regions.

8. The method of claim 7 wherein the substrate and the monocrystalline epitaxial layer have a first conductivity type and the interconnection regions, the lower sinker regions and the upper sinker regions have a second conductivity type.

9. The method of claim 7 wherein:
    the lower sinker regions comprise first regions in contact with a first end of respective interconnection regions and second regions in contact with a second end of the respective interconnection regions; and
    the upper sinker regions comprise third regions substantially aligned with the second regions and a pocket region, the pocket region extending in the polycrystalline epitaxial region and having portions in direct electrical contact with the first regions.

10. The method of claim 7, further comprising forming insulating material regions on the structure portion of the monocrystalline epitaxial layer.

11. The method of claim 10 wherein the step of forming insulating material regions comprises forming insulating regions and a sacrificial region, the method further comprising:

forming trenches in the polycrystalline epitaxial region; and removing the sacrificial region through the trenches, thereby forming suspended structures.

12. The method of claim 11 wherein the microintegrated structure includes a microactuator comprising a rotor and a stator; the rotor comprising a suspended mass connected, by suspension elements, to anchoring and biasing portions formed in the polycrystalline epitaxial region and connected to respective interconnection regions by respective first regions; the polycrystalline epitaxial region also housing fixed biasing regions connected to fixed electrodes of the stator and, through respective first regions, to respective interconnection regions.

13. The method of claim 10 wherein the step of forming insulating material regions comprises:

forming protective regions of non-oxidizable material extending over the monocrystalline epitaxial layer and covering the lower sinker regions;

carrying out local oxidation; and selectively removing the protective regions at least partially above the lower sinker regions.

14. The method of claim 7 wherein carrying out a second epitaxial growth includes forming a monocrystalline epitaxial region on a portion of the monocrystalline epitaxial layer that is not covered by the semiconductor seed layer.

* * * * *